(12) United States Patent
Zhang et al.

(10) Patent No.: US 10,034,222 B2
(45) Date of Patent: Jul. 24, 2018

(54) SYSTEM AND METHOD FOR MAPPING A SERVICE-LEVEL TOPOLOGY TO A SERVICE-SPECIFIC DATA PLANE LOGICAL TOPOLOGY

(71) Applicant: Huawei Technologies Co., Ltd., Shenzhen (CN)

(72) Inventors: Hang Zhang, Nepean (CA); Aaron James Callard, Ottawa (CA); Nimal Gamini Senarath, Ottawa (CA); Petar Djukic, Ottawa (CA); Alex Stephenne, Stittsville (CA); Ngoc Dung Dao, Ottawa (CA); Hamidreza Farmanbar, Ottawa (CA); Xu Li, Nepean (CA); Kaveh Shafiee, North Vancourver (CA); Philippe Leroux, Ottawa (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 122 days.

(21) Appl. No.: 14/297,269

(22) Filed: Jun. 5, 2014

(65) Prior Publication Data
US 2014/0362730 A1 Dec. 11, 2014

Related U.S. Application Data

(60) Provisional application No. 61/631,786, filed on Jun. 6, 2013.

(51) Int. Cl.
*H04W 40/24* (2009.01)
*H04L 12/715* (2013.01)

(52) U.S. Cl.
CPC ........... *H04W 40/246* (2013.01); *H04L 45/64* (2013.01)

(58) Field of Classification Search
CPC .... H04W 40/246; H04L 45/64; H04L 45/302; H04L 45/42
See application file for complete search history.

(56) References Cited

U.S. PATENT DOCUMENTS

| 7,962,582 B2 | 6/2011 | Potti et al. |
| 2010/0058436 A1 | 3/2010 | Maes |

(Continued)

FOREIGN PATENT DOCUMENTS

| CN | 102075402 A | 5/2011 |
| CN | 102904794 A | 1/2013 |

(Continued)

OTHER PUBLICATIONS

Duelli (Duelli, et al, Experimental Demonstration of Network Virtualization and Resource Flexibility in the COMCON Project, TridentCom 2012, LNICST 44, pp. 114-129, 2012).*

(Continued)

*Primary Examiner* — Michael Thier
*Assistant Examiner* — Zhensheng Zhang
(74) *Attorney, Agent, or Firm* — Slater Matsil, LLP (57) ABSTRACT

An embodiment method includes receiving service parameters for a service and locating logical network nodes for a service-specific data plane logical topology at respective physical network nodes among a plurality of physical network nodes according to the service parameters, a service-level topology, and a physical infrastructure of the plurality of physical network nodes. The method also includes defining connections among the logical network nodes according to the service parameters, the service-level topology, and the physical infrastructure, and defining respective connections for a plurality of UEs to at least one of the logical network nodes according to the service parameters, the service-level topology, and the physical infrastructure. The method further includes defining respective functionalities for the logical network nodes.

30 Claims, 11 Drawing Sheets

(56) References Cited

U.S. PATENT DOCUMENTS

| | | | |
|---|---|---|---|
| 2012/0054347 A1 | 3/2012 | Lee et al. | |
| 2013/0058357 A1 | 3/2013 | Koponen et al. | |
| 2013/0135993 A1 | 5/2013 | Morrill et al. | |
| 2015/0236919 A1* | 8/2015 | Suzuki | H04L 41/12 398/45 |

FOREIGN PATENT DOCUMENTS

| | | |
|---|---|---|
| CN | 103051629 A | 4/2013 |
| CN | 103109505 A | 5/2013 |
| EP | 2765751 A1 | 8/2014 |
| JP | 2012533253 A | 12/2012 |
| WO | 2013015980 A1 | 1/2013 |

OTHER PUBLICATIONS

International Search Report received in Application No. PCT/US14/41264 dated Oct. 22, 2014, 3 pages.

Ferguson, A., et al., "Hierarchical Policies for Software Defined Networks", Workshop on Hot Topics in Software Defined Networks, 2012, 6 pages.

Hou, Y., et al., "On the Mapping Between Logical and Physical Topologies", First International Communication Systems and Networks and Workshops, 2009, 10 pages, Bangalore.

Kassler, A., et al., "Towards QoE-Driven Multimedia Service Negotiation and Path Optimization With Software Defined Networking", 20th International Conference on Software, Telecommunications and Computer Networks (SoftCOM), 2012, pp. 1-5.

Duan, Q., et al., "A Survey on Service-Oriented Network Virtualization Toward Convergence of Networking and Cloud Computing", IEEE Transactions on Network and Service Management, Dec. 2012, 20 pages, vol. 9, No. 4.

Pan, P., et al., "Software-Defined Network (SDN) Problem Statement and Use Cases for Data Center Applications", Network Working Group, Intended Status: Standards Track, Mar. 11, 2012, 14 pages.

Rubio-Loyola, J., et al., "Scalable Service Deployment on Software-Defined Networks", IEEE Communications Magazine, Dec. 2011, 10 pages, vol. 49, No. 12.

* cited by examiner

SYSTEM AND METHOD FOR MAPPING A SERVICE-LEVEL TOPOLOGY TO A SERVICE-SPECIFIC DATA PLANE LOGICAL TOPOLOGY

This application claims the benefit of U.S. Provisional Application No. 61/831,786, titled "Framework for Software Defined Content or Traffic Delivery," filed on Jun. 6, 2013, which application is hereby incorporated herein by reference.

TECHNICAL FIELD

The present invention relates generally to a software defined topology (SDT) and, in particular embodiments, to a system and method for mapping a service-level topology to a service-specific data plane logical topology.

BACKGROUND

Driven largely by smart phones, tablets, and video streaming, the amount of wireless data handled by wireless networks has risen markedly and is expected to continue to rise by orders of magnitude over the next ten years. In addition to the sheer volume of data, the number of devices is expected to continue to grow exponentially, possibly reaching into the billions of devices, along with radically higher data rates. Different applications will place different requirements on the performance of future wireless networks. Future wireless networks are expected to be highly flexible, highly efficient, open, and customizable for customers and consumers.

SUMMARY OF THE INVENTION

An embodiment method of mapping a service-level topology for a service to a service-specific data plane logical topology for a network having a plurality of physical network nodes includes receiving service parameters for the service. Logical network nodes for the service-specific data plane logical topology are then located at respective physical network nodes among the plurality of physical network nodes. The locating is done according to the service parameters, the service-level topology, and a physical infrastructure of the plurality of physical network nodes. Connections among the logical network nodes are defined according to the service parameters, the service-level topology, and the physical infrastructure. Respective connections for a plurality of UEs to at least one of the logical network nodes are defined according to the service parameters, the service-level topology, and the physical infrastructure. The method also includes defining respective functionalities for the logical network nodes.

An embodiment communication system includes a data plane and a control plane. The data plane is configured to transport network traffic for a service among a plurality of physical network nodes that compose a physical infrastructure. The control plane includes a software defined topology (SDT) module. The SDT module is configured to receive service parameters for the service. The SDT module is further configured to locate logical network nodes for a service-specific data plane logical topology at respective physical network nodes among the plurality of physical network nodes according to the service parameters, a service-level topology for the service, and the physical infrastructure. The SDT module is further configured to define connections among the logical network nodes according to the service parameters, the service-level topology, and the physical infrastructure, and define respective connections for a plurality of UEs to at least one of the logical network nodes according to the service parameters, the service-level topology, and the physical infrastructure. The SDT module is further configured to define respective functionalities for the logical network nodes.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The advent of cloud-based networking has complicated the ability of future wireless networks to satisfy expected demands for higher throughput, lower latencies, lower energy, lower costs, and drastically more numerous connections. Cloud-based networking fundamentally redefines the endpoints and the time frame for which network services are provisioned. It requires the network be much more nimble, flexible, and scalable. Thus, technologies such as network function virtualization (NFV) and software defined networking (SDN) have become increasingly important in building future wireless networks. NFV enables network functions that are traditionally tied to hardware to run on a cloud computing infrastructure in a data center. Although the separation of the data plane, the control plane, and the management plane may not be feasible in the commercial cloud, the separation of those network functions from the hardware infrastructure will be a cornerstone of future wireless network architectures. One benefit is the ability to elastically support network functional demands. SDN is an architectural framework for creating intelligent programmable networks, where the control planes and the data planes are decoupled, network intelligence and state are logically centralized, and the underlying network infrastructure is abstracted from the application. To further enable future wireless networks, it is realized herein, the control plane can use customer information and provider information to form a software defined topology (SDT). The SDT can be combined with the SDN and software defined protocol (SDP) to create a customized virtual network (VN). A virtual network is a collection of resources virtualized for a particular service. Customers include users of services via a UE, terminal, or other customer device. Providers include service providers, VN operators, and other providers of services over the wireless network.

The SDT provides a framework for software defined content delivery that allows operators to define on-demand and service specific data plane architecture, i.e., logical topology, to enable more efficient use of network resources and ensure quality of experience (QoE) to customers. It is realized herein SDT can map service level logical topology to data plane logical topology before the SDN is formed. The mapping produces a service-specific data plane logical topology, which is sometimes referred to as the customized VN topology or simply VN topology. For each application, service, or VN, the SDT can determine an on-demand and customized logical data plane topology. The SDT selects physical locations of logical network nodes for the logical data plane. The SDT can also define the topology of the nodes in the data plane topology. Additionally, the SDT defines service-specific data process functionalities for logical nodes in the data plane logical topology. A logical node is a software defined entity implemented at a physical network node that can assume a variety of roles and perform many functions. A logical node can be a user-specific virtual serving gateway (v-u-SGW), a service-specific virtual serving gateway (v-s-SGW), or a content container, among other roles. The SDT determines the data plane logical topology for each application, service, or VN according to requirements from the operators or customers of the application, service, or VN. These requirements can include QoE and quality of service (QoS). The SDT also determines the data plane logical topology according to the service level logical topology, service traffic characteristics, customer distribution, mobility speed predictions, and traffic load predictions, among other parameters. The SDT allows the data plane logical topology to adapt to changes in traffic load and traffic load predictions, network node capabilities, and mobility of customer devices. It is further realized herein the SDT can be managed by network providers, VN providers, or customers.

Figure 1:
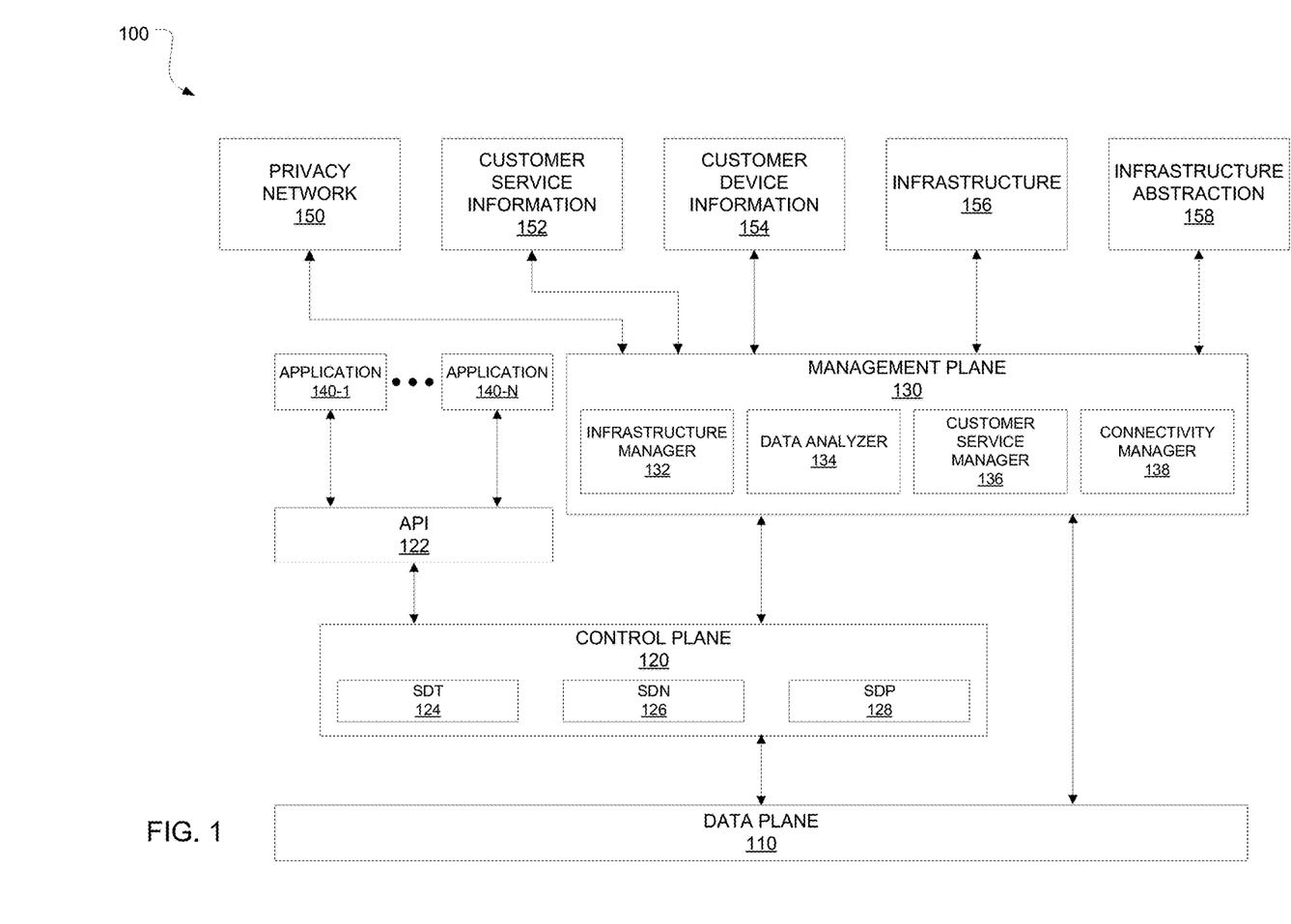
FIG. 1 is a block diagram of one embodiment of a logical functional architecture 100 for a wireless network.

FIG. 1 is a block diagram of one embodiment of a logical functional architecture 100 for a wireless network. Architecture 100 separates the wireless network into a data plane 110, a control plane 120, and a management plane 130. Data plane 110 transports network traffic among the various network nodes and UEs attached to the wireless network. Control plane 120 makes network traffic decisions and transports control signals among the various network nodes and UEs. Management plane 130 provides various management and administrative functionality for the network. Interfaces exist among management plane 130, control plane 120, and data plane 110, enabling each to carry out its respective functionality. Additionally, control plane 120 has an application programming interface (API) 122 that allows various applications 140-1 through 140-N to access control plane 120.

Architecture 100 also includes various databases that are occasionally accessed by management plane 130 in carrying out its functionalities. These databases include a privacy network database 150, a customer service information database 152, a customer device information database 154, an infrastructure database 156, and an infrastructure abstraction database 158. Privacy network database 150 is a repository for topology information, node capabilities, states, and security information. Customer service information database 152 is a repository for authentication and security information related to customer devices, i.e., UEs. Customer device information database 154 is a repository for capabilities, locations, and states of customer devices. Infrastructure database 156 is a repository for network topology, node capabilities, and states. Infrastructure abstraction database 158 is a repository for various infrastructure abstractions within the wireless network.

In architecture 100, management plane 130 provides various functionalities through respective control blocks, including: an infrastructure manager 132, a data analyzer 134, a customer service manager 136, and a connectivity manager 138. Management plane 130, in certain embodiments, can provide additional functionalities, such as content service management, which is responsible for defining content caches in the radio access network (RAN), configuring cache-capable network nodes, and managing content forwarding.

In architecture 100, control plane 120 provides various functionalities through several control blocks, including an SDT 124, an SDN 126, and an SDP 128. SDN 126 is responsible for customized resource allocation. SDP 128 is responsible for customized data plane processes. SDT 124 is responsible for customized logical data plane topology.

SDT 124, SDN 126, and SDP 128 can be implemented in one or more processors, one or more application specific integrated circuits (ASICs), one or more field-programmable gate arrays (FPGAs), dedicated logic circuitry, or any combination thereof, all collectively referred to as a processor. The respective functions for SDT 124, SDN 126, and SDP 128 can be stored as instructions in non-transitory memory for execution by the processor.

Figure 2:
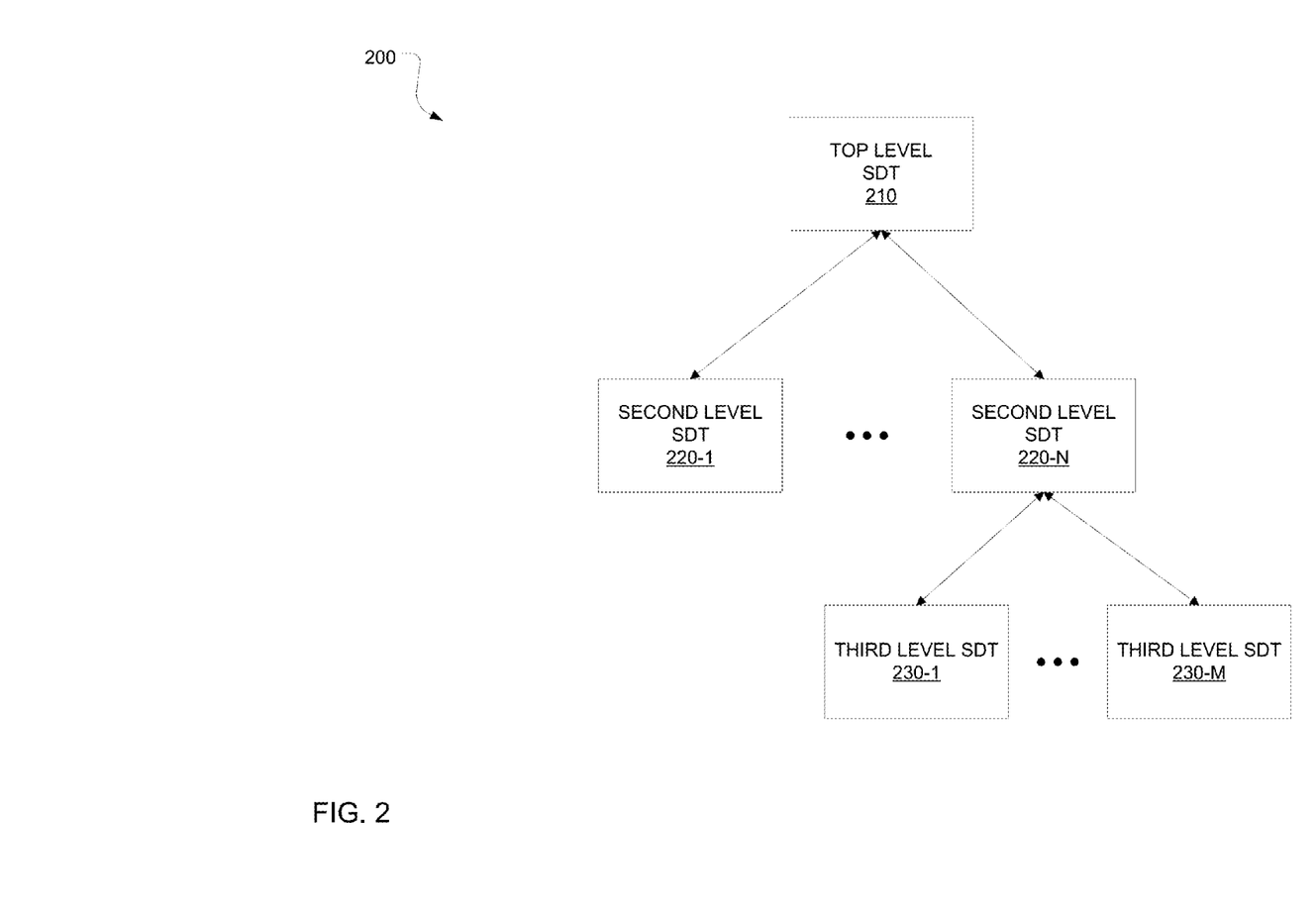
FIG. 2 is a block diagram of one embodiment of a hierarchical SDT architecture.

FIG. 2 is a block diagram of one embodiment of a hierarchical SDT architecture 200. Architecture 200 includes a top level SDT 210 configured to control and manage one or more operator or geographical fraction of the network. The division of the network into the hierarchy can be done according to the physical infrastructure, an abstraction of the physical infrastructure, or an abstraction of a lower level of abstraction. Top level SDT 210 controls and manages second level SDTs 220-1 through 220-N. Second level SDT 220-N is configured to control and manage third level SDTs 230-1 through 230-M.

Figure 3:
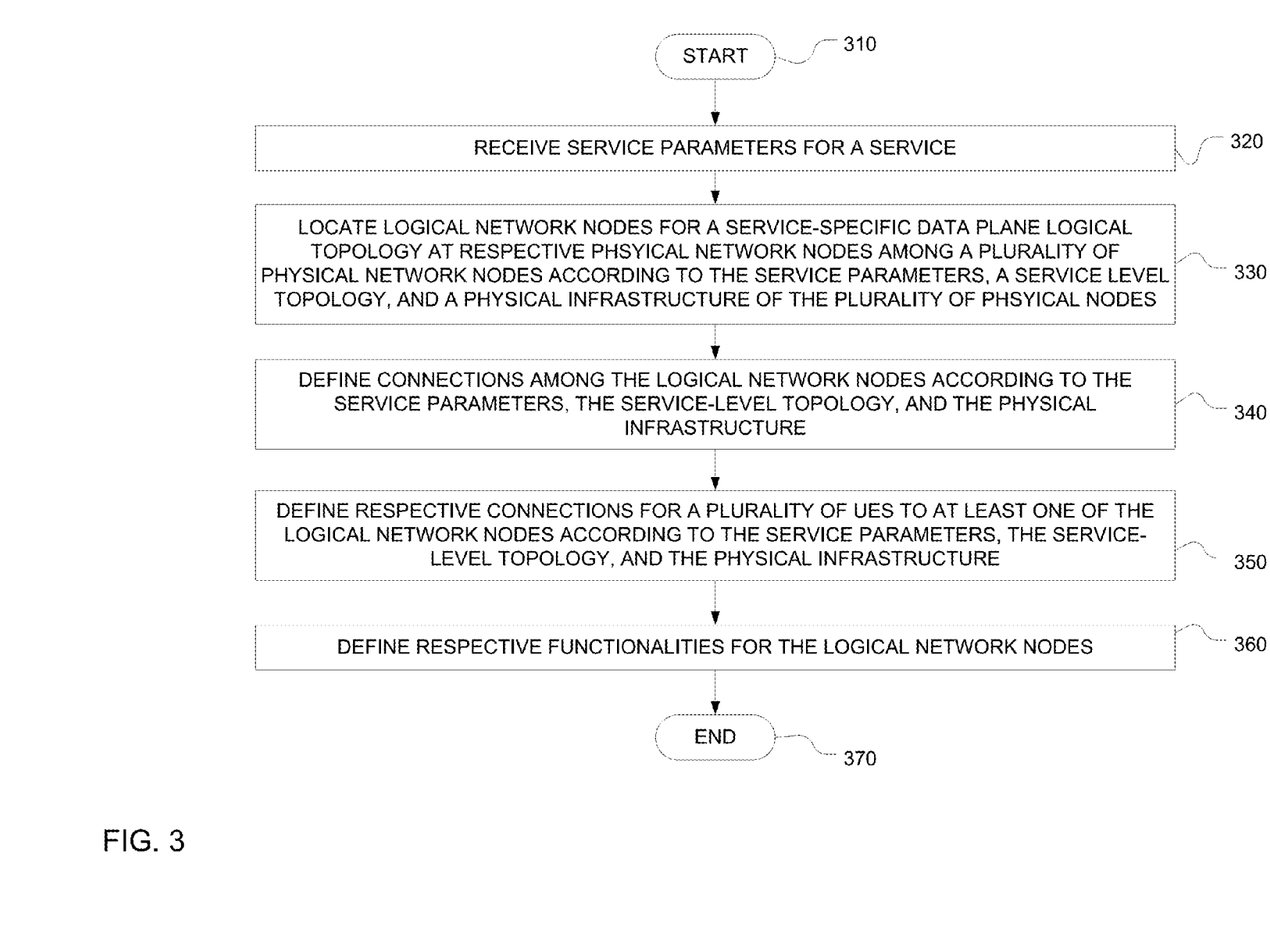
FIG. 3 is a flow diagram of one embodiment of a method of defining a service-specific data plane logical topology for a network.

FIG. 3 is a flow diagram of one embodiment of a method of defining a service-specific data plane logical topology for a network. The network has a physical infrastructure that describes a plurality of physical network nodes. The method begins at a start step 300. At a receiving step 320, service parameters are received for a service. The service parameters can vary per service. Service parameters can include service/application characteristics, end-consumer equipment behavior, and traffic statistics. Service/application characteristics include parameters such as QoE requirements, QoS requirements, and content. End-consumer equipment behavior includes parameters such as mobility, location, and geographic distribution. Traffic statistics include parameters such as network capability, traffic load, and network congestion.

The service corresponds to a service-level topology, i.e., a service logical topology. According to the service-level topology, the service parameters, and the physical infrastructure, at a node locating step 330, logical network nodes are located at respective physical network nodes among the plurality of physical network nodes to form the service-specific data plane logical topology. Connections among the selected logical network nodes are defined in a first connection definition step 340. The connections are defined according to the service parameters, the service-level topology, and the physical infrastructure. In a second connection definition step 350, respective connections for a plurality of UEs are defined. Each UE is logically connected to at least one of the logical network nodes. The respective connections are determined according to the service parameters, the service-level topology, and the physical infrastructure. At a functionalities definition step 360, functionalities are defined for the logical network nodes. The functionalities can vary per logical node. For example, when a logical network node is a v-s-SGW, the functionalities can include message aggregation, information extraction and transmission, reaction based on information extraction to control a controlled entity of the service, message authentication, and others. When a logical network node is a v-u-SGW, the functionalities can include serving as an anchor point for data forwarding, network access protection, privacy protection, and others. These functionalities can be defined by service customers, network operators, or both. The method then ends at an end step 370.

Figure 4:
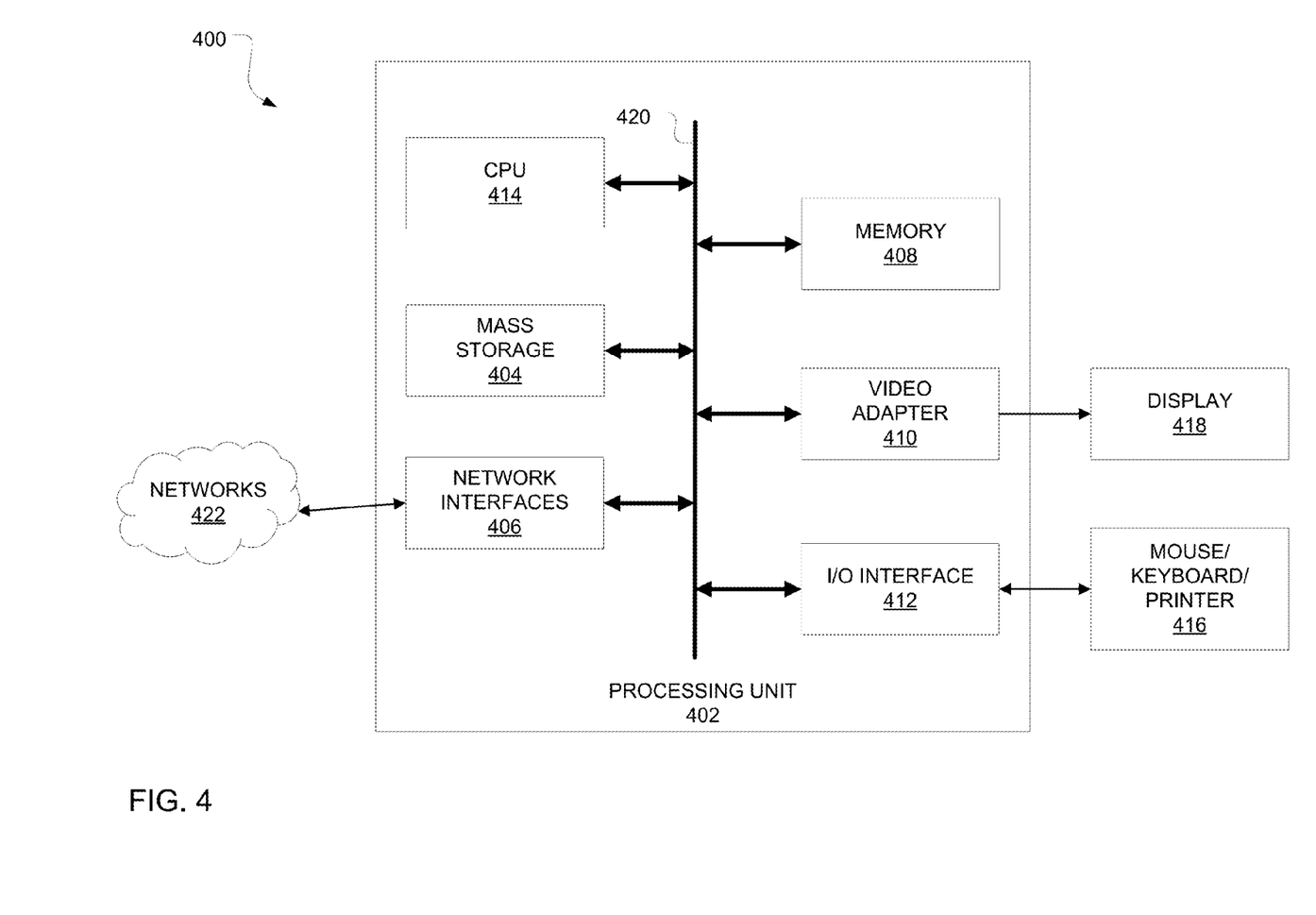
FIG. 4 is a block diagram of one embodiment of a computing system.

FIG. 4 is a block diagram of a computing system 400 that may be used for implementing the devices and methods disclosed herein. Specific devices may utilize all of the components shown or only a subset of the components. Levels of integration may vary from device to device. Furthermore, a device may contain multiple instances of a component, such as multiple processing units, processors, memories, transmitters, receivers, etc. The computing system 400 may comprise a processing unit 402 equipped with one or more input/output devices, such as a speaker, microphone, mouse, touchscreen, keypad, keyboard, printer, display, and the like. The processing unit may include a central processing unit (CPU) 414, memory 408, a mass storage device 404, a video adapter 410, and an I/O interface 412 connected to a bus 420.

The bus 420 may be one or more of any type of several bus architectures including a memory bus or memory controller, a peripheral bus, video bus, or the like. The CPU 414 may comprise any type of electronic data processor. The memory 408 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 408 may include ROM for use at boot-up, and DRAM for program and data storage for use while executing programs.

The mass storage 404 may comprise any type of non-transitory storage device configured to store data, programs, and other information and to make the data, programs, and other information accessible via the bus 420. The mass storage 404 may comprise, for example, one or more of a solid state drive, hard disk drive, a magnetic disk drive, an optical disk drive, or the like.

The video adapter 410 and the I/O interface 412 provide interfaces to couple external input and output devices to the processing unit 402. As illustrated, examples of input and output devices include a display 418 coupled to the video adapter 410 and a mouse/keyboard/printer 416 coupled to the I/O interface 412. Other devices may be coupled to the processing unit 402, and additional or fewer interface cards may be utilized. For example, a serial interface such as Universal Serial Bus (USB) (not shown) may be used to provide an interface for a printer.

The processing unit 402 also includes one or more network interfaces 406, which may comprise wired links, such as an Ethernet cable or the like, and/or wireless links to access nodes or different networks. The network interfaces 406 allow the processing unit 402 to communicate with remote units via the networks. For example, the network interfaces 406 may provide wireless communication via one or more transmitters/transmit antennas and one or more receivers/receive antennas. In an embodiment, the processing unit 402 is coupled to a local-area network 422 or a wide-area network for data processing and communications with remote devices, such as other processing units, the Internet, remote storage facilities, or the like.

Figure 5:
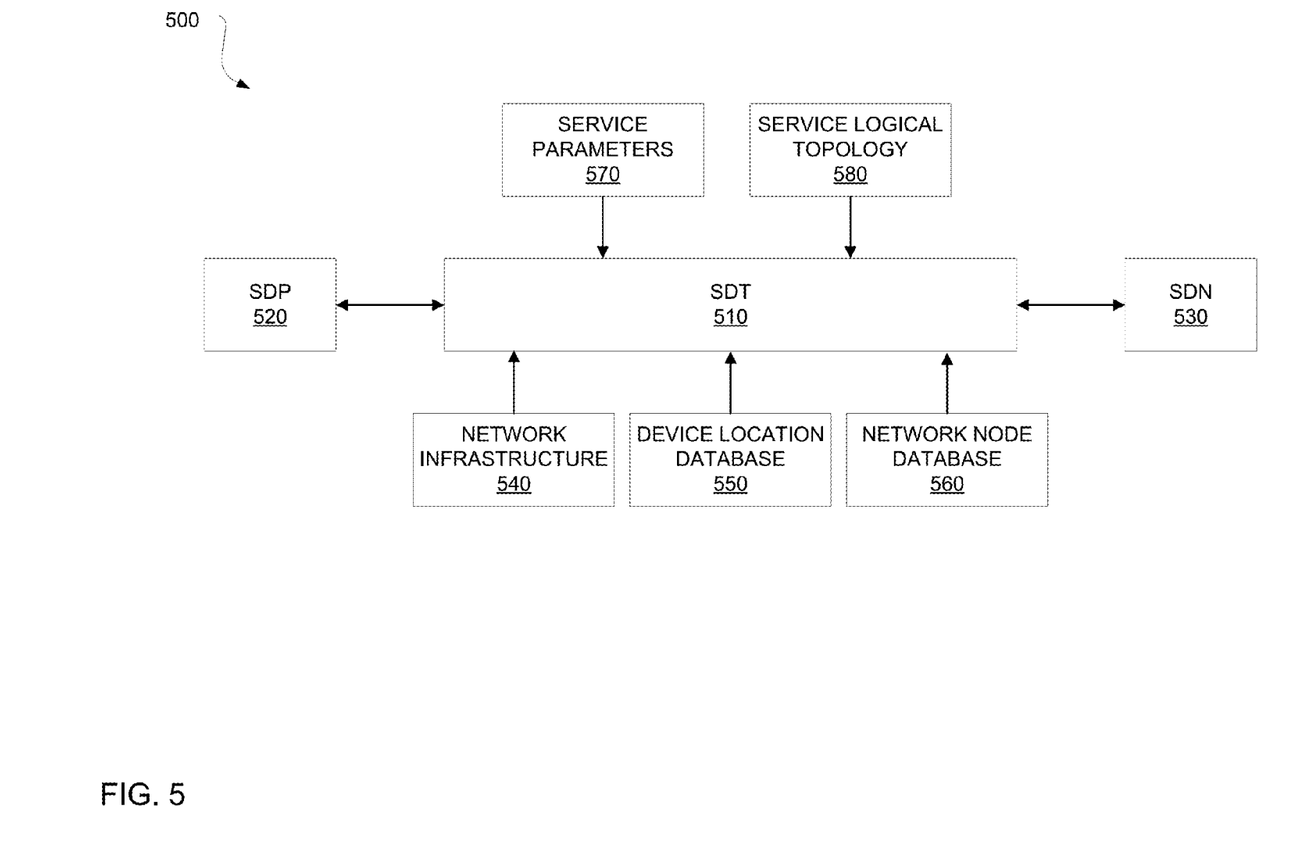
FIG. 5 is a block diagram of one embodiment of a control plane.

FIG. 5 is a block diagram illustrating one embodiment of a control plane 500. Control plane 500 includes an SDT 510, an SDP 520, and an SDN 530. SDT 510 is coupled to several databases, including a network infrastructure 540, a device location database 550, and a network node database 560. SDT 510 is configured to receive service parameters 570 and a service logical topology 580 as inputs. Service parameters 570 can vary per service. For example, for machine-to-machine communication, service parameters 570 can include traffic statistics and QoS requirements; while for content dissemination into the network service parameters 570 can also include content request statistics, such as the actual content and consumer geographic distribution. SDT 510 is further configured to communicate with SDP 520 over an SDT/SDP interface and with SDN 530 over an SDT/SDN interface. Like service parameters 570, the data flow over the SDT/SDP interface and the SDT/SDN interface can vary per service.

Figure 6:
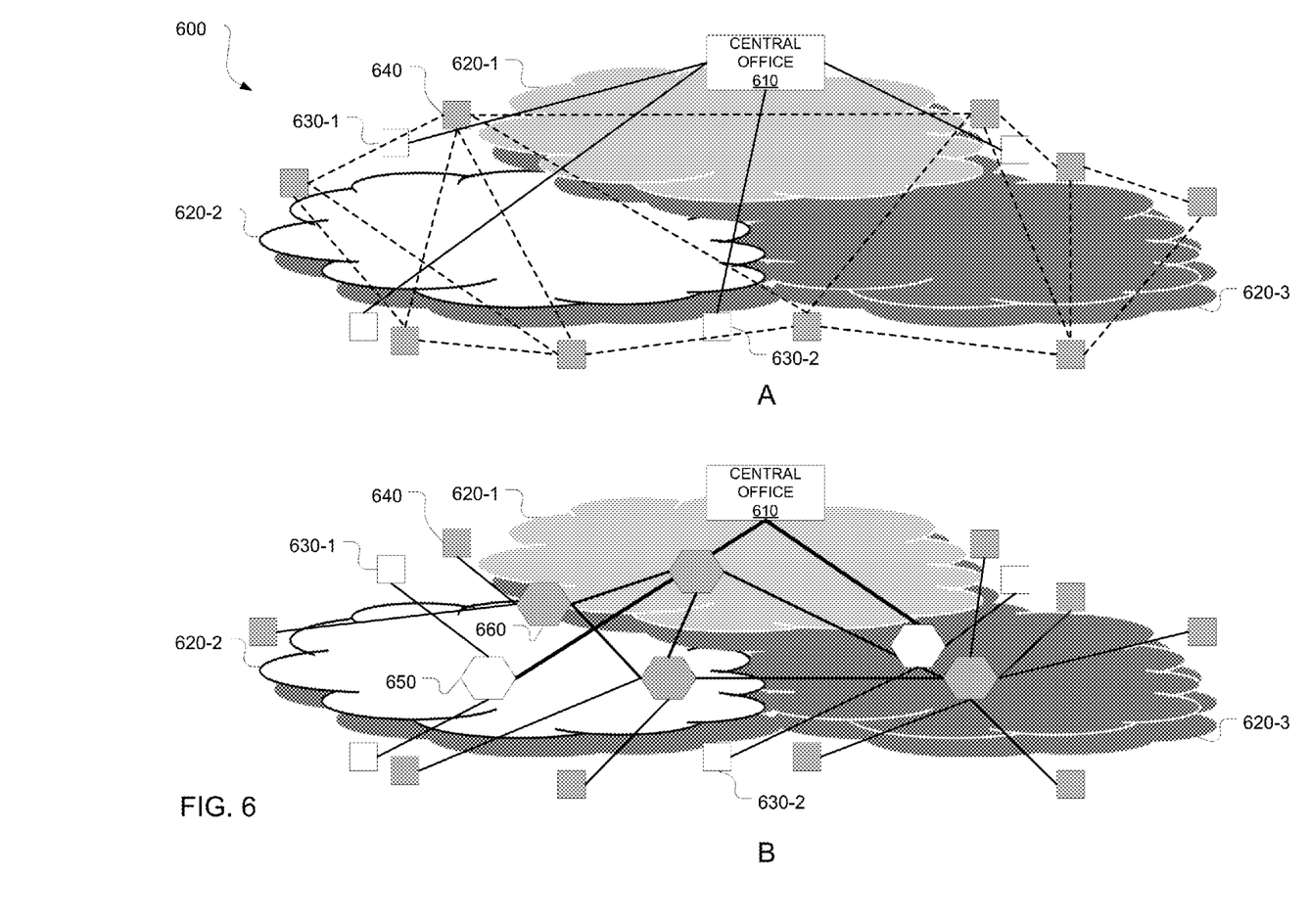
FIG. 6 is an illustration of one embodiment of a SDT for machine-to-machine communication.

FIG. 6 is an illustration of one embodiment of a SDT 600 for machine-to-machine communication over a network. Machine-to-machine communication can be carried out between two or more UEs for a given machine-to-machine session. The simplest form of machine-to-machine communication is between two UEs, however, machine-to-machine communication extends to any number of UEs. For example, a voice conference session having four attendees, i.e., four UEs, includes machine-to-machine communication among all four UEs. Machine-to-machine communication generally involves many short bursty transmissions. FIG. 6-A illustrates three regions of the network, region 620-1, region 620-2, and region 620-3. The regions are supported by a central office 610. FIG. 6-A shows service-level topologies for two services. The first service has a star service-level topology, which generally includes links from multiple machines or devices to a central office. Such a service may include, for example, meter reading. Customers of the first service include a UE 630-1, a UE 630-2, and several other devices represented by white boxes. The service-level topology includes links, represented by solid lines, from each of the UEs to central office 610. For example, machine-to-machine communication between UE 630-1 and UE 630-2 corresponds to service-level topology represented by a link between UE 630-1 and central office 610 and another link between UE 630-2 and central office 610. The second service has a mesh topology, which generally includes multiple machines or devices fully connected. Such a service can include, for example, private social networks, video conferencing, and basic machine-to-machine communication. Customers of the second service include a UE 640 and several other devices represented by grey boxes. The service-level topology includes links, represented by dashed lines, between each UE attached to the VN, as each UE can communicate to each other. The task of an SDT module is to define the corresponding service-specific data plane logical topology according to a number of inputs.

FIG. 6-B illustrates a service-specific data plane logical topology for machine-to-machine communication for the two services. For the first service, two v-s-SGWs 650, represented by white hexagons, are created to form a star, or tree, topology. The two v-s-SGWs 650, sometimes referred to as sub-hubs, are created and located at physical nodes according to service parameters, the service-level topology, and the physical infrastructure. The service parameters useful for locating the sub-hubs include traffic statistics, distribution of devices, QoE requirements, and QoS requirements. Each of the two v-s-SGWs 650 are connected to gateway 610. The customers of the first service connect to the two v-s-SGWs 650. For the second service, four v-s-SGWs 660, represented by grey hexagons, are created to form a mesh topology. Like the two v-s-SGWs 650, the four v-s-SGWs 660 are created according to service parameters, the service-level topology, and the physical infrastructure. The four v-s-SGWs 660 are variously connected to each other. The customers of the second service connect to the four v-s-SGWs 660. The service-specific data plane logical topology for each service is then passed to the SDN module. Additionally, the SDT defines data process functionalities for each of v-s-SGWs 650 and v-s-SGWs 660, and provides those to the SDP module.

Figure 7:
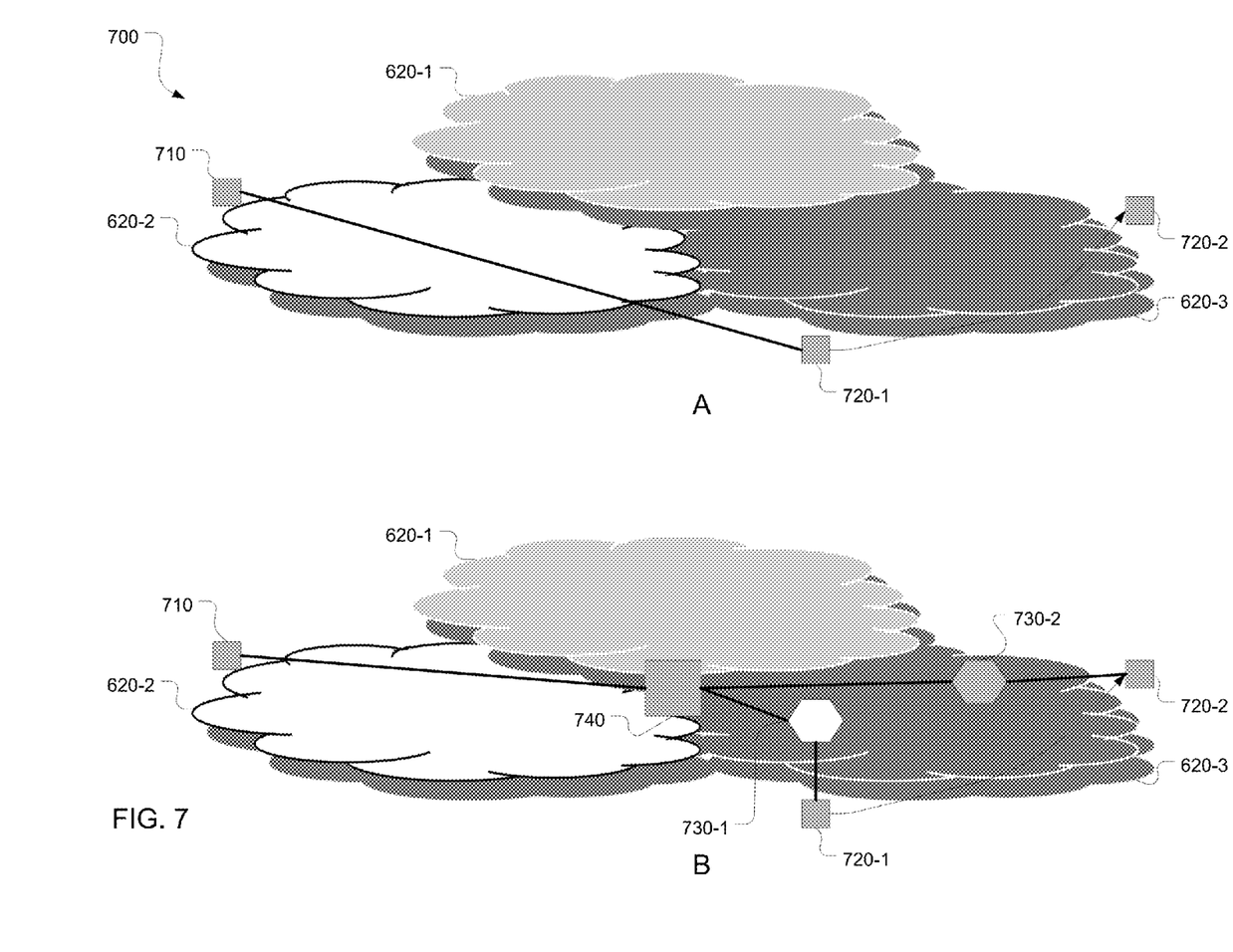
FIG. 7 is an illustration of one embodiment of a SDT for virtual network migration.

FIG. 7 is an illustration of one embodiment of a SDT 700 for virtual network migration in a network. FIG. 7-A illustrates the three regions of FIG. 6, region 620-1, region 620-2, and region 620-3. FIG. 7-A also illustrates the service-level topology for a connection between a UE 710 and a UE 720. UE 720 is migrating across region 620-3 from a position at 720-1 to a position at 720-2. The service-level topology includes a direct link between UE 710 and UE 720. FIG. 7-B illustrates a service-specific data plane logical topology for the migration of UE 720. The service-specific data plane logical topology includes a v-u-SGW 730-1 to serve UE 720 at position 720-1, and a v-u-SGW 730-2 to serve UE 720 at position 720-2. V-u-SGW 730-1 and v-u-SGW 730-2 are connected to a logical node 740, to which UE 710 also connects. The locations of u-v-SGW 730-1 and u-v-SGW 730-2 are determined according to the location and mobility of UE 720, the capabilities of logical node 740, QoS requirements, QoE requirements, and the network infrastructure. The service-specific data plane logical topology for UE 720 is then passed to the SDN module. Additionally, the SDT defines data process functionalities for each of v-u-SGW 730-1 and v-u-SGW 730-2, and provides those to the SDP module.

Figure 8:
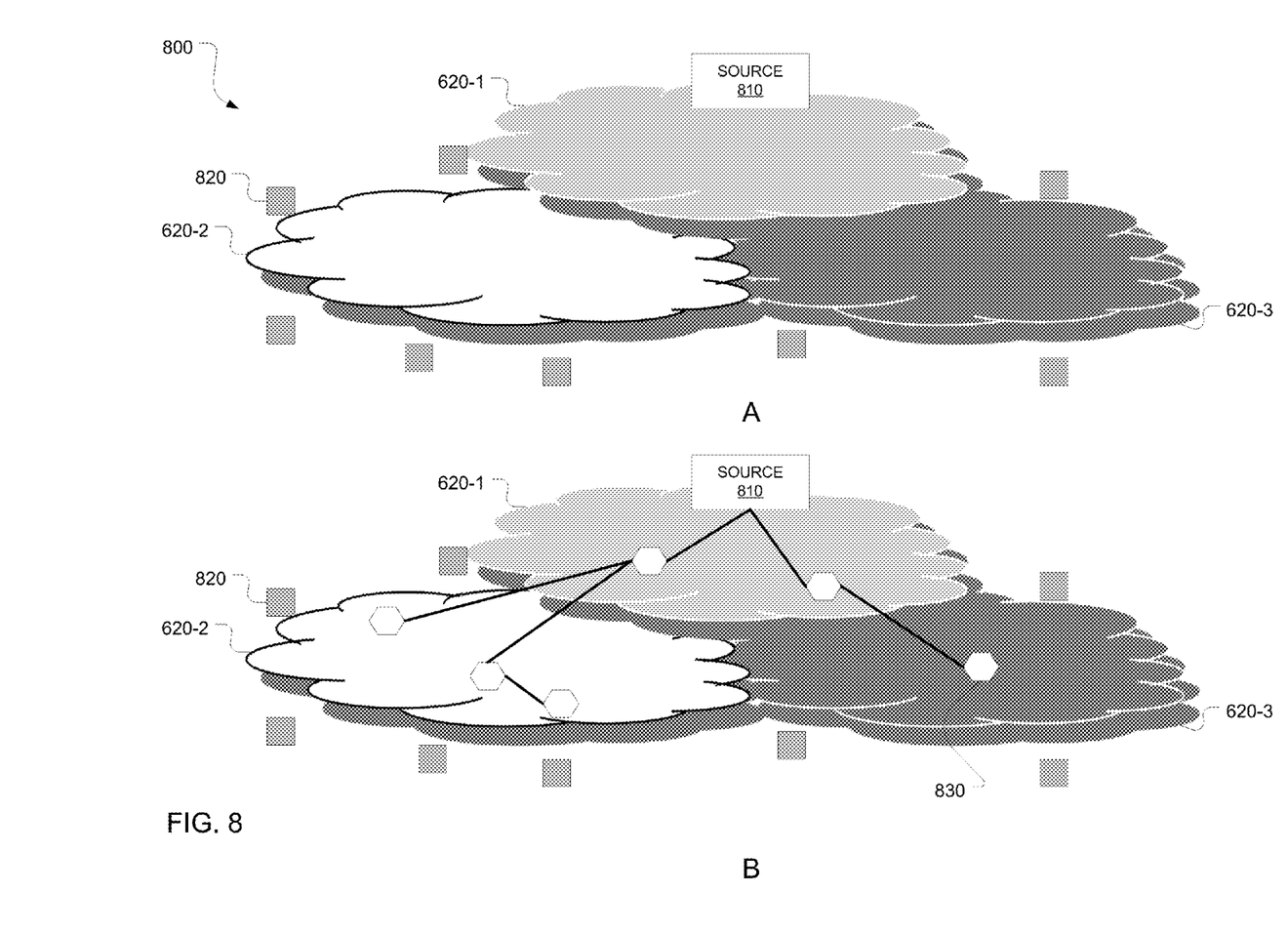
FIG. 8 is an illustration of one embodiment of a SDT for content dissemination into a network.

FIG. 8 is an illustration of one embodiment of a SDT 800 for content dissemination into a network. FIG. 8-A illustrates the three regions of FIG. 6, region 620-1, region 620-2, and region 620-3. FIG. 8-A also illustrates a content source 810 and a VN having UEs 820, represented by grey boxes in SDT 800. FIG. 8-B illustrates a service-specific data plane logical topology for content dissemination from a source 810 into the network. The service-specific data plane logical topology includes multiple content container nodes 830, represented by white hexagons, distributed among the three regions. Locations for the content container nodes at physical nodes are determined according to consumer geographic distribution, the content itself, traffic statistics, and QoS requirements, in addition to the network infrastructure and the service-level topology. The content is then distributed to each of content container nodes 830. The service-specific data plane logical topology is then passed to the SDN module. Additionally, the SDT defines data process functionalities for each of content container nodes 830, and provides those to the SDP module.

Figure 9:
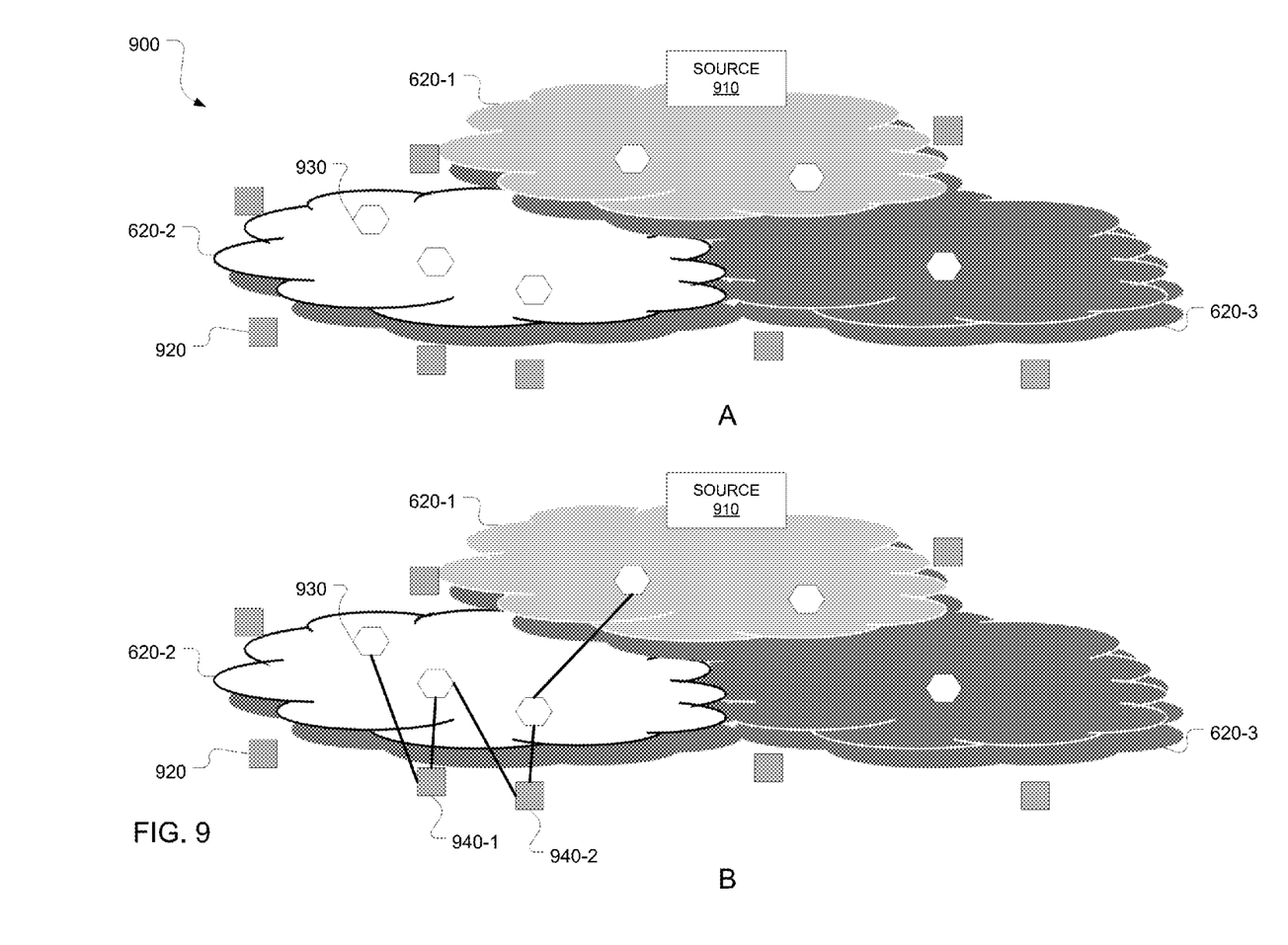
FIG. 9 is an illustration of one embodiment of a SDT for content delivery to a consumer.

FIG. 9 is an illustration of one embodiment of a SDT 900 for content delivery to a consumer. FIG. 9-A illustrates the three regions of FIG. 6, region 620-1, region 620-2, and region 620-3. FIG. 9-A also includes a content source 910 and multiple content containers 930, represented by white hexagons. FIG. 9-B illustrates a service-specific data plane logical topology for content delivery to a consumer. Content containers are selected to serve a particular consumer according to the content requested and device characteristics for the particular consumer. For example, UEs 940-1 and 940-2 request content disseminated to content containers 930. The content containers are determined according to the location and mobility of UEs 940-1 and 940-2.

Figure 10:
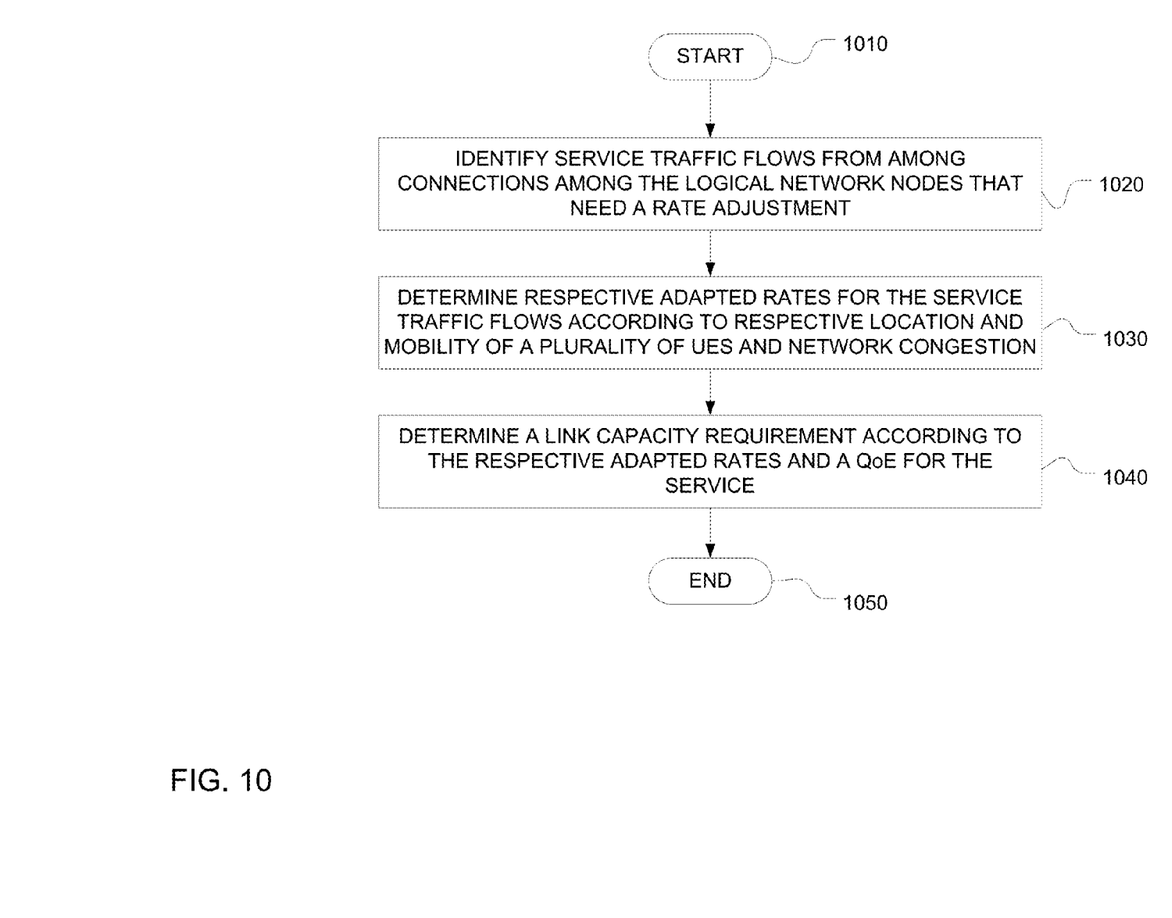
FIG. 10 is a flow diagram of one embodiment of dynamic rate adaptation in a SDT.

FIG. 10 is a flow diagram of one embodiment of a method of dynamic rate adaptation for a SDT. The SDT generates a service-specific data plane logical topology that includes data rates among various connections among a plurality of UEs and a plurality of logical network nodes. The plurality of logical network nodes are respectively located at physical network nodes. The method begins at a start step 1010. At a flow identification step 1020 traffic flows are identified from the connections among the logical network nodes that need a rate adjustment. At a rate adaptation step 1030, flow rates are determined for the traffic flows from source to destination according to QoE requirements, device location and mobility, node capabilities, and the network infrastructure. Then, according to the QoE requirements and the adapted rates, at a determining step 1040, a new link capacity requirement is determined for the data plane logical topology. The rate adaptation affects data rates of application layer traffic flows. The method then ends at an end step 1050.

Figure 11:
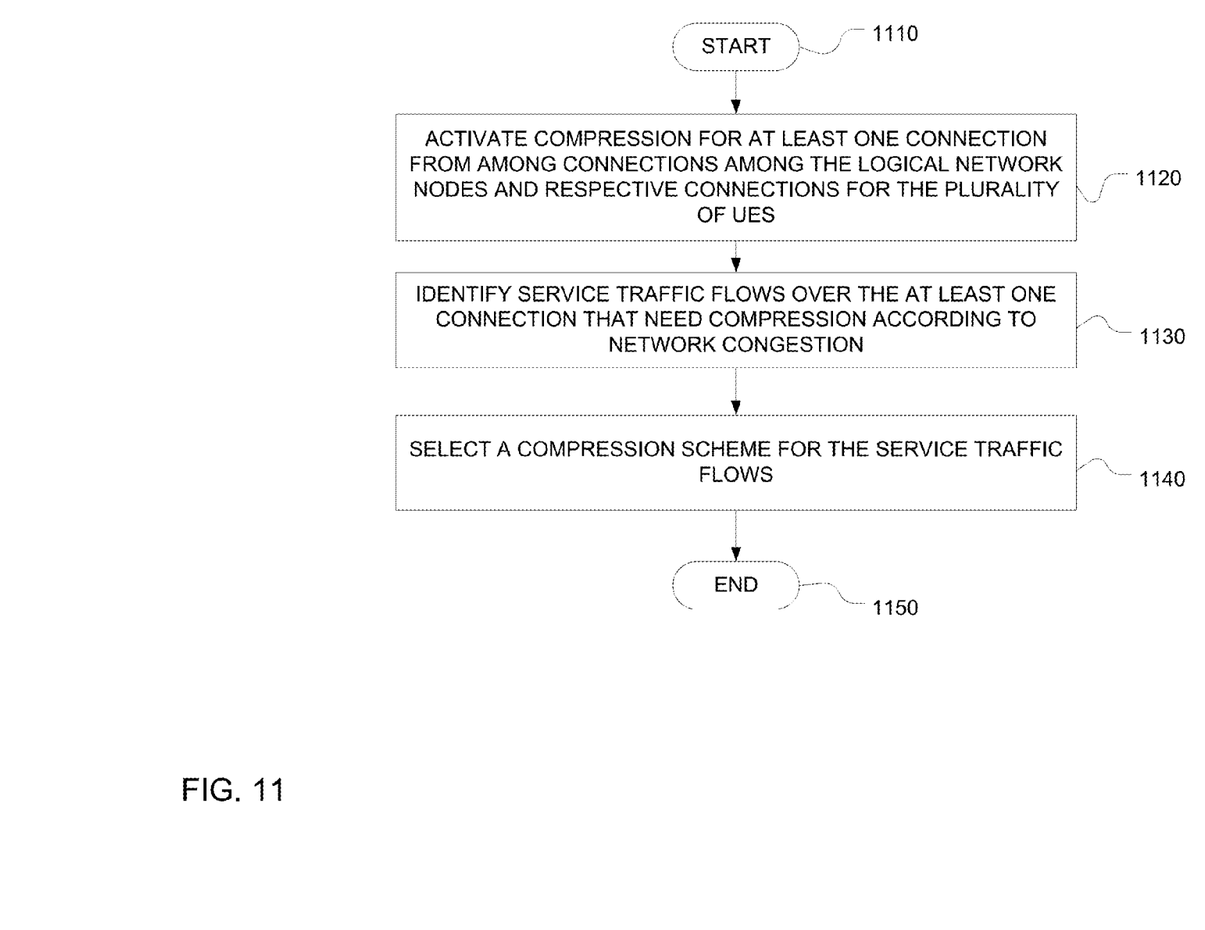
FIG. 11 is a flow diagram of one embodiment of dynamic data compression.

FIG. 11 is a flow diagram of one embodiment of a method of dynamic data compression for a SDT. The SDT generates a service-specific data plane logical topology that includes data rates among various connections among a plurality of UEs and a plurality of logical network nodes. The plurality of logical network nodes are respectively located at physical network nodes. Data compression involves rate changes of traffic flows over certain portions of data paths, which also impacts the link capacity requirements for the data plane logical topology. The method begins at a start step 1110. At an activation step 1120, compression is activated for at least one connection from the various connections among the plurality of UEs and the plurality of logical network nodes. Service traffic flows over the at least one connection are then identified, at an identification step 1130, that need compression. Identification is carried out according to network congestion, the network infrastructure, and the service-level topology. A compression scheme is then selected at a selection step 1140. The method then ends at an end step 1150.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method comprising:
   mapping, by a software defined topology (SDT) implemented on a processor executing instructions stored on a non-transitory memory storage, a service-level topology for a service to a service-specific data plane logical topology for a network having a plurality of physical network nodes, the mapping comprising:

receiving service parameters for the service;

selecting, in accordance with functionalities defined by customers and service providers, a set of network functions for the service;

after the selecting the network functions, selecting, by the SDT in accordance with the received service parameters, the service-specific data plane logical topology for the network, the selecting the service-specific data plane logical topology comprising:

defining respective physical nodes in the plurality of physical network nodes at which to locate the network functions according to the service parameters and a physical infrastructure of the plurality of physical network nodes;

defining logical connections among the network functions according to the service parameters and the physical infrastructure; and defining respective connections for a plurality of user equipments (UEs) to at least one of the network functions according to the service parameters and the physical infrastructure; and after the mapping, providing the service-specific data plane logical topology to a software defined network (SDN) for physical resource mapping.

2. The method of claim 1 wherein the receiving the service parameters includes receiving service requirements from a customer for the service.

3. The method of claim 1 wherein the receiving the service parameters includes receiving service requirements from at least one provider of the service.

4. The method of claim 1 wherein the defining the logical connections among the network functions includes defining respective data rates for each logical connection.

5. The method of claim 1 further comprising providing the network functions to a software defined protocol (SDP) for configuring data plane processes.

6. The method of claim 1 wherein the network functions comprise at least one service-specific virtual serving gateway (v-s-SGW) and the selecting comprises defining the at least one v-s-SGW for the service within the service-specific data plane logical topology according to the physical infrastructure, the service-level topology, and the service parameters, wherein the service includes machine-to-machine communication.

7. The method of claim 6 wherein the network functions comprise at least one service-specific virtual server for the service within the service-specific data plane logical topology according to the physical infrastructure, the service-level topology, a distribution of the UEs, and the service parameters, wherein the UEs comprise customers of the service.

8. The method of claim 6 wherein the machine-to-machine communication comprises communication between at least two UEs from the plurality of UEs.

9. The method of claim 1 wherein the network functions comprise logical content container nodes and the selecting includes defining the logical content container nodes for content dissemination into the network according to the service parameters and the service-level topology, wherein the service parameters include quality of service (QoS) requirements, traffic statistics, and content request statistics.

10. The method of claim 9 wherein the selecting includes selecting source nodes from the logical content container nodes for content delivery to at least one UE among the plurality of UEs according to a requested content and the at least one UE.

11. The method of claim 1 wherein the network functions comprise a first user-specific virtual serving gateway (v-u-SGW) and the selecting includes defining the first v-u-SGW for a UE among the plurality of UEs according to the physical infrastructure, the service parameters, and the service-level topology, wherein the service parameters include service quality of experience (QoE) requirements and location and mobility of the UE.

12. The method of claim 11 wherein the defining the respective physical nodes further comprises defining a second v-u-SGW for the UE when the UE moves to a new location.

13. The method of claim 1 further comprising:

identifying service traffic flows from the logical connections among the network functions that need a rate adjustment;

determining respective adapted rates for the service traffic flows according to respective location and mobility of the plurality of UEs and network congestion; and determining a link capacity requirement according to the respective adapted rates and a quality of experience (QoE) for the service.

14. The method of claim 1 further comprising:

activating compression for at least one connection from the connections among the network functions and the respective connections for the plurality of UEs;

identifying service traffic flows over the at least one connection that need compression according to network congestion; and selecting a compression scheme for the service traffic flows.

15. The method of claim 1 wherein the network functions include message aggregation.

16. The method of claim 1, the selecting the service-specific data plane logical topology further comprising defining physical connections for each of the plurality of UEs to one of the physical network nodes.

17. A communication system, comprising:

a non-transitory memory storage storing instructions including a software defined topology (SDT); and one or more processors in communication with the memory storage, wherein the one or more processors execute the instructions including the SDT to:

map a service-level topology for a service to a service-specific data plane logical topology for a network having a plurality of physical network nodes, wherein the one or more processors execute the instructions to map comprises the one or more processors execute the instructions to:

receive service parameters for the service, select, in accordance with functionalities defined by customers and service providers, a set of network functions for the service, and after the selecting the network functions, select, by the SDT in accordance with the received service parameters, the service-specific data plane logical topology for the network, wherein the one or more processors execute the instructions to select the service-specific data plane logical topology comprises the one or more processors execute the instructions to:

define respective physical nodes in the plurality of physical network nodes at which to locate the network functions according to the service parameters and a physical infrastructure of the plurality of physical network nodes, define logical connections among the network functions according to the service parameters and the physical infrastructure, and define respective connections for a plurality of user equipments (UEs) to at least one of the network functions according to the service parameters and the physical infrastructure, and after the mapping the service-level topology, provide the service-specific data plane logical topology to a software defined network (SDN) for physical resource mapping.

18. The communication system of claim 17 wherein the service parameters include at least one of quality of experience (QoE) requirements, UE capabilities, service traffic characteristics, and network traffic load predictions.

19. The communication system of claim 17 wherein the SDT comprises a top-level SDT controlling and managing a plurality of lower-level SDTs.

20. The communication system of claim 19 wherein the plurality of lower-level SDTs are allocated according to the physical infrastructure.

21. The communication system of claim 17 wherein the SDT receives the service parameters from a customer for the service.

22. The communication system of claim 17 wherein the SDT provides the network functions to a software defined protocol (SDP) for configuring data plane processes.

23. The communication system of claim 17 wherein the network functions comprise at least one service-specific virtual serving gateway (v-s-SGW), and wherein the one or more processors execute the instructions to select the set of network functions comprises the one or more processors execute the instructions to define the at least one v-s-SGW for the service within the service-specific data plane logical topology according to the physical infrastructure, the service-level topology, and the service parameters, wherein the service includes machine-to-machine communication.

24. The communication system of claim 23 wherein the network functions comprise at least one service-specific virtual server for the service within the service-specific data plane logical topology according to the physical infrastructure, the service-level topology, a distribution of the UEs, and the service parameters, wherein the UEs comprise customers of the service.

25. The communication system of claim 23 wherein the machine-to-machine communication comprises communication between at least two UEs from the plurality of UEs.

26. The communication system of claim 17 wherein the network functions comprise logical content container nodes, and wherein the one or more processors execute the instructions to select the set of network functions includes the one or more processors execute the instructions to define the logical content container nodes for content dissemination into the network according to the service parameters and the service-level topology, wherein the service parameters include quality of service (QoS) requirements, traffic statistics, and content request statistics.

27. The communication system of claim 26 wherein the one or more processors execute the instructions to select the set of network functions includes the one or more processors execute the instructions to select source nodes from the logical content container nodes for content delivery to at least one UE among the plurality of UEs according to a requested content and the at least one UE.

28. The communication system of claim 17 wherein the network functions comprise a first user-specific virtual serving gateway (v-u-SGW), and wherein the one or more processors execute the instructions to select the set of network functions includes the one or more processors execute the instructions to define the first v-u-SGW for a UE among the plurality of UEs according to the physical infrastructure, the service parameters, and the service-level topology, wherein the service parameters include service quality of experience (QoE) requirements and location and mobility of the UE.

29. The communication system of claim 28 wherein the one or more processors execute the instructions to define the respective physical nodes comprises the one or more processors execute the instructions to define a second v-u-SGW for the UE when the UE moves to a new location.

30. The communication system of claim 17, wherein the one or more processors execute the instructions including the SDT to:

identify service traffic flows from the logical connections among the network functions that need a rate adjustment;

determine respective adapted rates for the service traffic flows according to respective location and mobility of the plurality of UEs and network congestion; and determine a link capacity requirement according to the respective adapted rates and a quality of experience (QoE) for the service.

* * * * *

UNITED STATES PATENT AND TRADEMARK OFFICE
CERTIFICATE OF CORRECTION

PATENT NO. : 10,034,222 B2
APPLICATION NO. : 14/297269
DATED : July 24, 2018
INVENTOR(S) : Hang Zhang et al.

Page 1 of 1

It is certified that error appears in the above-identified patent and that said Letters Patent is hereby corrected as shown below:

On the Title Page

Item (72) Inventors, Line 8, delete "Vancourver" and insert --Vancouver--.

Item (72) Inventors, Line 9, delete "(JP)" and insert --(CA)--.

Item (60) Related U.S. Application Data, Line 1, delete "61/631,786" and insert --61/831,786--.

Signed and Sealed this
Fourth Day of September, 2018

Andrei Iancu
*Director of the United States Patent and Trademark Office*